UNITED STATES PATENT OFFICE.

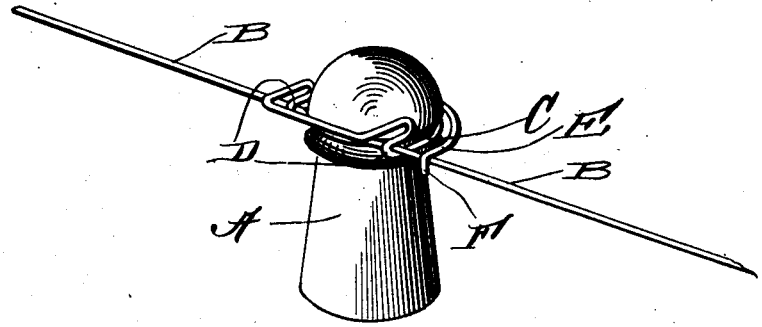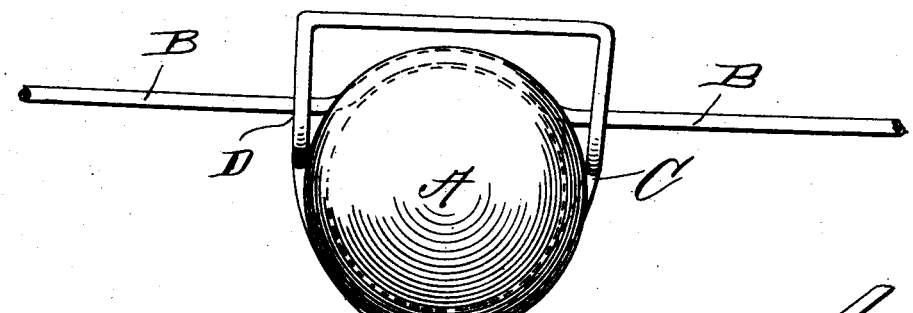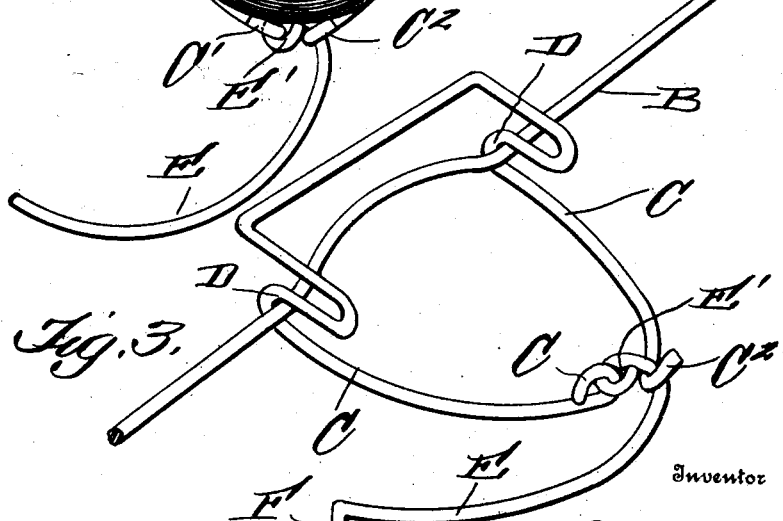

CHESTER J. ELLIOTT, OF BEAVER RIVER, NEW YORK.

MEANS FOR ATTACHING LINE-WIRES TO INSULATORS.

No. 887,930.      Specification of Letters Patent.      Patented May 19, 1908.

Application filed December 14, 1907. Serial No. 406,506.

*To all whom it may concern:*

Be it known that I, CHESTER J. ELLIOTT, a citizen of the United States, residing at Beaver River, town of Webb, in the county of Herkimer and State of New York, have invented certain new and useful Improvements in Means for Attaching Line-Wires to Insulators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in means for fastening line wires to insulators and the object in view is to produce a simple and efficient device of this nature whereby the wire may be easily and quickly attached to or released from the insulator.

More specifically, the invention comprises a stirrup-shaped member made preferably of wire and bent upon itself to form hooks adapted to receive the line wire, the ends of the stirrup-shaped wire being adapted to be drawn together by means of a lever, thereby causing the line wire to be held tightly against the insulator, the lever being held by its hooked end being caught over the line wire.

The invention comprises other details of construction and combinations and arrangements of parts which will be hereinafter fully described and then specifically defined in the appended claims.

I illustrate my invention in the accompanying drawings, in which:—

Figure 1 is a perspective view showing my improved means for holding the line wire to an insulator. Fig. 2 is a top plan view showing the lever released, and Fig. 3 is a detail view of the fastening device removed from the insulator.

Reference now being had to the details of the drawings by letter, A designates an insulator and B a line wire.

C designates a wire of substantially stirrup shape and has an eye C' at one end and a hook C² at its other end. Said wire C is bent upon itself to form the hooks D to receive the line wire and hold the same against the insulator.

E is a lever having an eye E' at one end engaging the eye C' and said lever is preferably curved as shown and is fulcrumed in the hook C² at one end of the wire and the free end of the lever is bent to form a hook F which, when the device is applied to the insulator, is adapted to engage over the line wire in the manner shown in Fig. 1 of the drawings, thereby causing the portions of the wire C which are bent to form hooks to hold the line wire securely against the insulator.

In applying the device, the stirrup-shaped member is placed over the line wire and the arms of the wire C which are curved are passed about the insulator and the lever E caught in the hook C² and, by swinging the lever, the shank portion thereof which is fulcrumed in the hook C² will cause the two arms of the stirrup-shaped wire to tightly bind against the insulator, preferably in the groove thereof and draw the line wire also in the groove of the insulator, causing the line wire to be held securely in place. The stirrup-shaped wire is held securely in a clamped relation by the hook at the end of the lever being caught over the line wire in the manner shown in Fig. 1. When it is desired to release the line wire from the insulator, the hooked end of the lever is sprung from over the line wire and the stirrup-shaped wire readily released from the insulator.

By the provision of a fastening device for insulators as shown and described, it will be observed that a simple and efficient means is afforded whereby the line wire may be quickly attached to and removed from the insulator without the use of any instrument usually employed for twisting the fastening wires.

What I claim is:—

1. A device for fastening line wires to insulators, comprising a fastening wire which is bent upon itself to form hooks for the reception of the line wire, a lever pivoted to one end of the fastening wire, and a hook at the other end of the latter in which said lever is fulcrumed, as set forth.

2. A device for fastening line wires to insulators, comprising a fastening wire which is bent upon itself to form hooks for the reception of the wire, a lever pivoted to one end of the fastening wire, a hook at the other end of the latter in which said lever is fulcrumed, said lever engaging the line wire and adapted to hold the ends of the fastening wire together, as set forth.

3. A device for fastening line wires to insulators, comprising a fastening wire which is bent upon itself to form hooks for the reception of the line wire, a lever pivoted to one end of the fastening wire, a hook at the other end of the latter in which said lever is fulcrumed, said lever having a hook formed therein adapted to engage the line wire, as set forth.

4. A device for fastening line wires to insulators, comprising, in combination with the insulator and line wire, a stirrup-shaped wire having portions thereof bent upon themselves to form hooks for the reception of the line wire, an eye at one end of the stirrup-shaped wire and a hook at its other end, a lever pivotally connected to said eye and curved and fulcrumed in said hook, the free end of the lever being bent at an angle and adapted to engage over the line wire, as set forth.

In testimony whereof I hereunto affix my signature in the presence of two witnesses.

CHESTER J. ELLIOTT.

Witnesses:
C. H. VAN AUKIN,
H. W. MORSE.